UNITED STATES PATENT OFFICE.

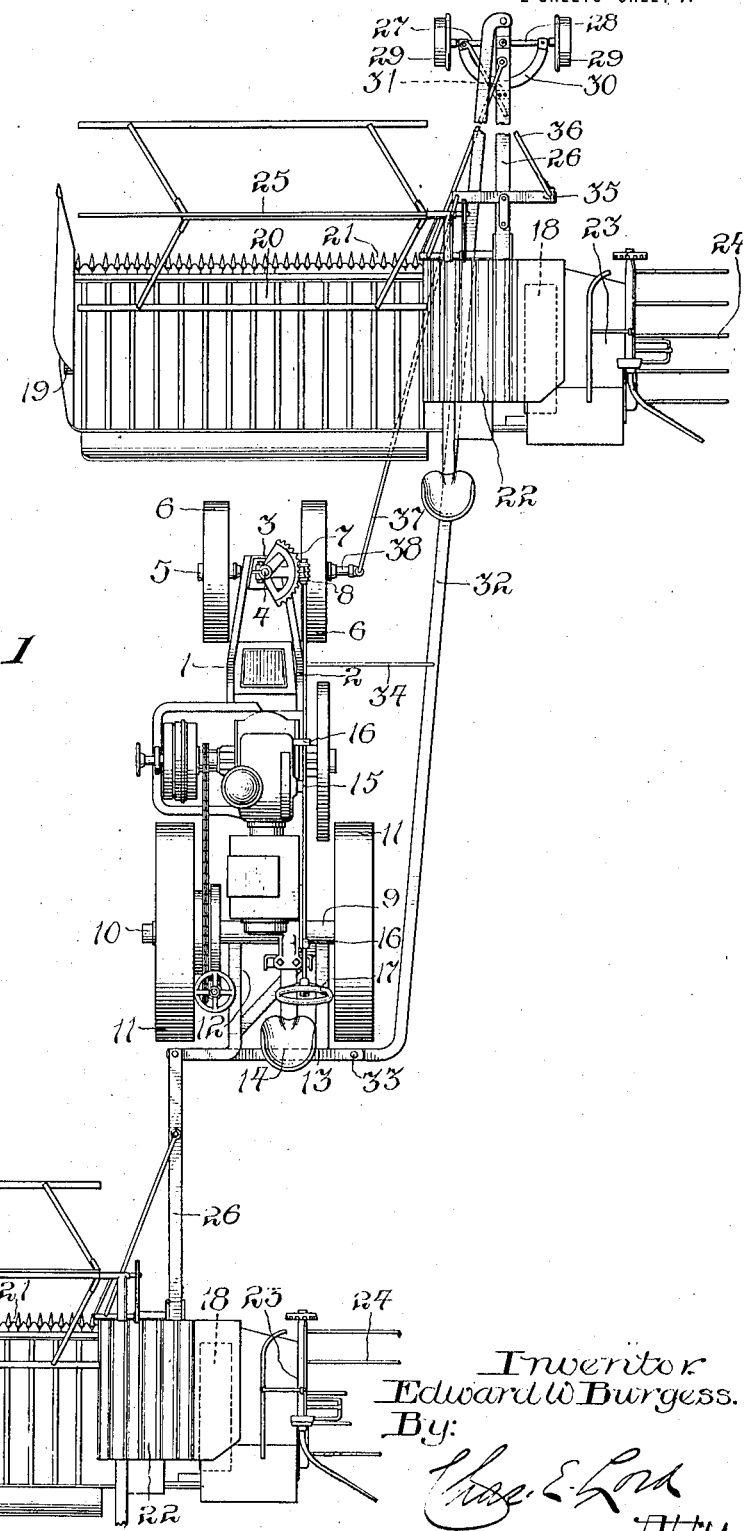

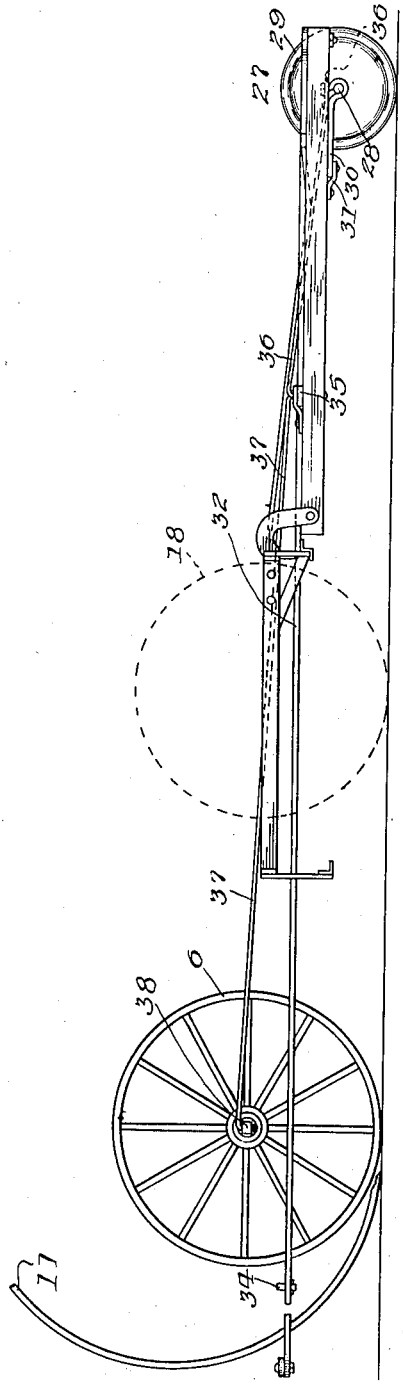

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

TRACTOR-PROPELLED HARVESTER.

1,290,017.   Specification of Letters Patent.   Patented Dec. 31, 1918.

Application filed April 6, 1916, Serial No. 89,377. Renewed November 14, 1917. Serial No. 202,068.

*To all whom it may concern:*

Be it known that I, EDWARD W. BURGESS, a citizen of the United States, residing at Chicago, in the county of Cook and State of Illinois, have invented certain new and useful Improvements in Tractor-Propelled Harvesters, of which the following is a full, clear, and exact specification.

My invention relates to tractor propelled harvesters, and comprises means whereby any of the common forms of grain harvesters and binders may be propelled by a tractor, and means whereby the tongue truck of the harvester is operatively connected with the steering truck of the tractor and controlled thereby in a manner to cause the harvester to turn with and be directed in its path of movement by the tractor; the object of the invention being to provide means whereby one operator may control the movements of a tractor and a plurality of harvesters coupled therewith.

This object is attained by means of the mechanism illustrated in the accompanying drawings, in which Figure 1 shows a top plan view of a tractor having one harvester disposed in a trailing and offset relation therewith and another harvester disposed at the front of the tractor and propelled in offset relation with the trailing harvester and tractor, and Fig. 2 shows the construction illustrated in Fig. 1 in side elevation, certain of the parts of the harvester and tractor being omitted for the sake of clearness.

The tractor includes longitudinally disposed truck frame members 1 and 2, having their front ends secured to a bolster member 3, in which is journaled the upper end of a shaft 4, that is operatively connected with a steering axle 5, having carrying wheels 6 journaled upon its opposite ends. A worm sector is secured to the upper end of the shaft 4 and is operatively engaged by a worm 8. A tubular frame member 9 is secured to the rear ends of the truck frame members, an axle 10 being journaled in the tubular member and having traction wheels 11 mounted upon its opposite ends. A rearwardly extending draft frame 12 is carried by the truck frame and includes a transversely disposed draft bar 13 in rear of the traction wheels, an operator's seat 14, and a longitudinally disposed shaft 15 journaled in bearings 16 carried by the truck frame, having its front end connected with the worm 8 and its rear end provided with a hand wheel 17 whereby the operator may manipulate the steering mechanism as desired.

The harvesters include a traction wheel 18, grain wheel 19, a grain platform 20, cutting apparatus 21, elevator 22, binder mechanism 23, sheaf carrier 24, reel 25, and draft tongue 26. The front end of the draft tongue of the trailing harvester is pivotally connected with the grainward end of the draft bar 13 of the tractor and is drawn forward or propelled rearward in proper relation therewith as the operator manipulates the steering mechanism thereof. The tongue of the harvester disposed in front of the tractor is carried by a steering truck 27 including an axle 28 pivotally connected with the front end of the tongue and having truck wheels 29 journaled upon opposite ends thereof, and 30 represents a U-shaped sway bar secured to the truck axle and slidably engaging the lower side of the tongue and retained in engagement therewith by means of a clip member 31 secured to the tongue.

The harvester is propelled by means of a longitudinally disposed push member 32, having its rear end detachably connected, by means of a pin 33, with the stubbleward end of the draft bar 13 of the tractor, and its middle part, by means of a link 34, with the front end of the truck frame of the tractor. The push member passes under the platform of the harvester and its front end is pivotally connected with the front end of the draft tongue 26. 35 represents a transversely disposed evener pivoted intermediate its ends upon the rear end of the draft tongue and having its stubbleward end connected, by means of a link 36, with the grainward end of the truck axle 28, and its opposite end, by means of a link 37, with an extension 38 of the steering axle 5 of the tractor. The arms of the evener 35 have their respective lengths so proportioned relative to the respective lengths of the tongue truck axle 28 and the tractor steering axle 5 that the tongue truck will be turned by its connection with the tractor steering mechanism to a proper angle to cause the harvester to turn freely with the tractor when moved in any direction.

Having shown and described an embodiment of my invention, I do not desire that it be confined strictly to the details of its associated parts as illustrated, it being understood that changes may be made in the form, proportion and organization of its various parts without departing from the spirit of my invention as indicated by the appended claims.

What I claim as my invention and desire to secure by Letters Patent, is:

1. In combination, a tractor, a harvester including operative elements, and means connecting said harvester with said tractor extending beneath the operative elements.

2. In combination, a tractor, a harvester having operative elements, a tongue truck secured to said harvester, and means extending beneath the operative elements on said harvester and connecting said tractor with said tongue truck.

3. In combination, a tractor, steering means carried thereby, a harvester operatively connected to said tractor and including operative elements and steering mechanism, means connecting the tractor steering means with said harvester steering mechanism and extending beneath the operative elements of said harvester.

4. In combination, a tractor, steering means carried thereby, a harvester operatively connected to said tractor and including operative elements, a tongue truck carried by said harvester, and means connecting said tractor steering means with said tongue truck and extending beneath the operative elements of said harvester.

5. In combination, a tractor, steering means carried thereby, a harvester operatively connected to said tractor and including operative elements and steering mechanism, and means including an evener for connecting the tractor steering means with said harvester steering mechanism.

6. In combination, a tractor, a harvester, having operative elements and a tongue truck, and means connecting the rear end of said tractor with said tongue truck and extending beneath said operative elements on the harvester.

7. In combination, a tractor, steering means carried by said tractor, and including an axle and a steering wheel mounted thereon, a harvester operatively connected to said tractor, steering mechanism carried by said harvester, and means directly connecting the axle of the tractor to the steering mechanism of the harvester.

8. In combination, a tractor, steering means carried thereby and including an axle and a steering wheel mounted thereon, a harvester operatively connected to said tractor, steering mechanism carried by said harvester and including an axle and a steering wheel mounted thereon, and means directly connecting the steering axle of the tractor to the steering axle of the harvester.

9. In combination, a tractor, steering means carried thereby and including an axle and steering wheels mounted thereon, a harvester having a stub tongue, a tongue truck connected to said stub tongue, means connecting the tractor with the stub tongue, and means directly connecting the axle of the tractor steering means with the tongue truck whereby the harvester may be steered from the tractor.

10. In combination, a tractor, steering means carried thereby and including an axle and a steering wheel mounted thereon, a tractor frame, the harvester having a stub tongue, means connecting the rear end of the said tractor frame with the front end of said stub tongue, a tongue truck carried by said stub tongue, and means directly connecting the axle of the tractor steering means with the harvester tongue truck, whereby the harvester may be steered from the tractor.

11. In combination, a tractor, steering means carried thereby including a wheeled truck, a harvester operatively connected to said tractor and having a stub tongue, a steering wheel carried by an axle mounted on said stub tongue, an evener carried by said stub tongue, means operatively connecting the wheeled truck of the tractor with said evener, and means operatively connecting said evener with the axle of the harvester steering wheel.

12. In combination, a tractor, steering means carried thereby, a harvester operatively connected to said tractor and including cutting mechanism, a grain platform and steering wheels, and means connecting the tractor steering means directly with the harvester steering wheels.

13. In combination, a tractor including an axle and a steering wheel carried thereby, a harvester including grain cutting and conveying mechanism and steering mechanism, and means connecting the tractor axle directly to the harvester steering mechanism.

14. In combination, a tractor including steering wheels, a harvester connected to said tractor and including grain cutting and conveying mechanism and steering wheels, and means directly connecting the steering wheels of the tractor to the steering wheels of the harvester.

15. In combination, a tractor including a truck frame, a steering truck supporting the front end of said truck frame, traction wheels supporting the rear end of said truck frame, a harvester disposed in front of said tractor including a grain platform, a traction wheel, a grain wheel, a draft tongue, a tongue truck pivotally connected with the front end of said draft tongue, a longitudinally disposed push member having its front end pivotally connected with the front end of said draft tongue and its rear end with said tractor and secured against lateral movement relative to said tractor, and operative connections between said tongue truck and the steering truck of said tractor whereby said harvester is propelled and guided by said tractor.

16. In combination, a tractor including a truck frame, a steering truck supporting the front end of said truck frame, traction wheels supporting the rear end of said truck frame, a draft frame carried by the rear end of said truck frame, a harvester disposed in front of said tractor including a grain platform, a traction wheel, a grain wheel, a draft tongue, a tongue truck pivotally connected with the front end of said draft tongue, means for propelling said harvester, said means including a longitudinally disposed push member extending under said grain platform having its front end pivotally connected with the front end of said draft tongue and its rear end with said tractor and secured against lateral movement relative to said tractor, and an evener pivoted intermediate its ends upon the rear end of said tongue truck, one end of said evener being operatively connected with said tongue truck axle and its opposite end with said tractor steering truck whereby said harvester is propelled and steered by said tractor.

In testimony whereof I affix my signature.

EDWARD W. BURGESS.